W. E. Worthen Impt In Nails for Securing Weather Tiling & Siding

No. 121,305. Patented Nov. 28, 1871.

Inventor
W. E. Worthen

Witnesses
Rich S Gillespie 121,305

UNITED STATES PATENT OFFICE.

WILLIAM E. WORTHEN, OF NEW YORK, N. Y.

IMPROVEMENT IN NAILS FOR SECURING WEATHER-TILING AND SIDING.

Specification forming part of Letters Patent No. 121,305, dated November 28, 1871.

*To all whom it may concern:*

Figure 1:
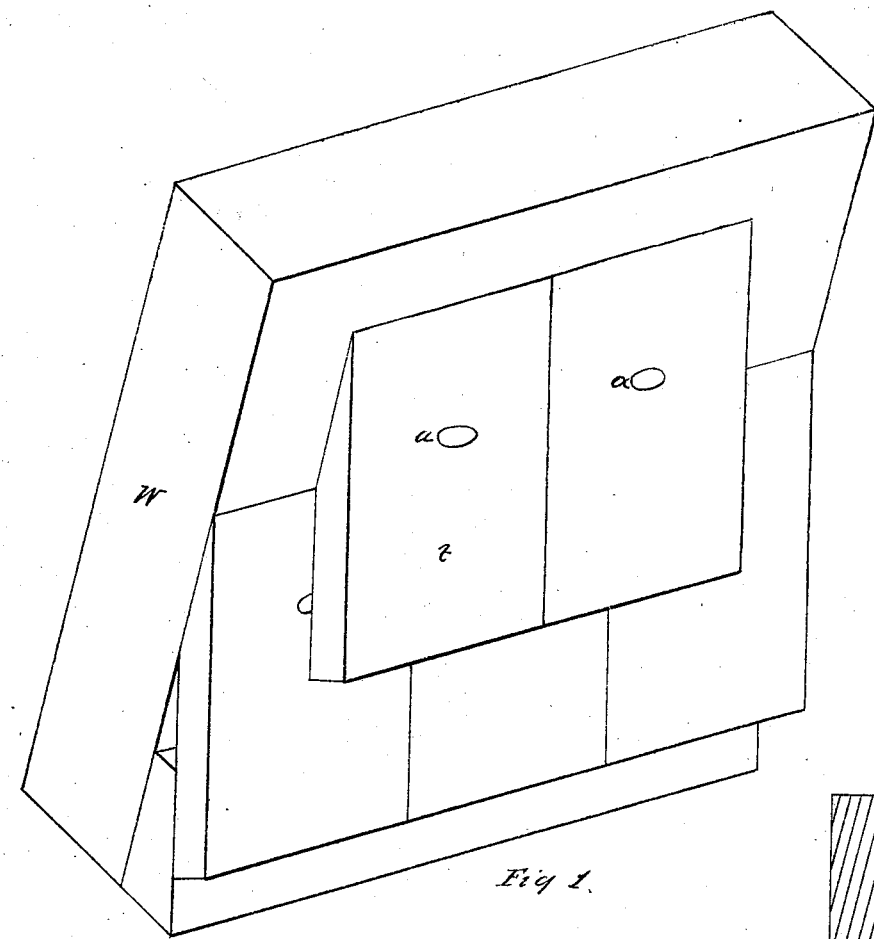
Figures 3, 4, 5, 6:
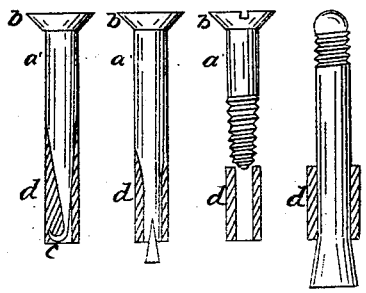
Figure 2:
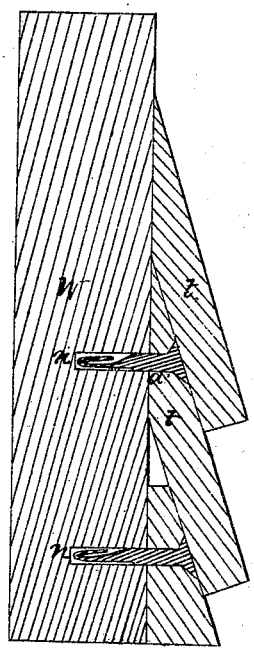

Be it known that I, WILLIAM E. WORTHEN, of the city, county, and State of New York, have invented a certain new and useful Improvement in the Means for Attaching and Fastening Weather-Tiling to the Walls of Buildings, of which the following is the specification:

In the drawing, Figure 1 is an isometrical perspective of the weather-tiling, secured to the wall by my improved method of attaching. Fig. 2 is a vertical cross-section of same. Fig. 3 is a view of the nail and bushing or jacket that surrounds the nail used in attaching the tiling to the wall; and Figs. 4, 5, and 6 are modifications of Fig. 3.

This invention consists in the construction of the nail to be used in fastening the tiling or siding to the wall of a building, in connection with a jacket or bushing that surrounds the nail, and into which the nail is driven, the object of the invention being to cover stone, brick, or other walls with tiling of slate, porcelain, terra-cotta, or other material, and secure it permanently and cheaply to such walls. W represents the wall of a building to be covered with weather-tiling or siding. $t$ is the tiling, which may be of slate, porcelain, terra-cotta, or other material, and is fastened to the wall by means of nail $a'$ going through the hole $a$ in the tiling. $a'$ is a nail having a flaring head, $b$, tapered on opposite sides from near the middle of its length to an edge at the end, but is tapered more on one side than on the other, as is seen in Fig. 3, is turned up in hook form at the sharp end at $c$— the hook turned to the side tapered the most. $d$ is a lead or other soft-metal bushing, the outer diameter being of the same measure as that of the body of the nail $a'$, and has a longitudinal opening from its upper or receiving-end to near its bottom, to receive the nail $a'$ in the form shown in Fig. 3. This bushing $d$ is placed in a hole, $n$, made in the wall W, which corresponds with the hole $a$ through the tiling. The nail $a'$ is now inserted in and through the tiling into the bushing, and its length being such that the hook $c$ will strike the bottom of the bushing, deflecting the hook-part of the nail as it is driven into the soft metal of the bushing; and the further the nail is driven into the bushing the more it compresses the metal into the hole in the wall by reason of its increasing size, and the more the point is deflected and forced into the soft metal of the bushing, thus making a complete clinch in the metal, as seen in Fig. 2, and causing the soft metal to fill the hole so compactly that the nail cannot be withdrawn without such force being used as would tear the metal bushing from the hole in the wall or breaking the wall itself. This makes a cheap and durable means of securely attaching weather-tiling to walls. As a modification of the above-described nail a bolt, tapered at its inserted end and split at its point for the insertion of a wedge, and surrounded by the bushing $d$, which is placed in the hole in the wall and the bolt driven down, the wedge expanding the inner end; and the taper above compacting the soft metal of the bushing into the hole is the result, as is seen in Fig. 5; or a common gimlet-pointed wood-screw may be used instead of the nail, and screwed into the bushing $d$, as seen in Fig. 6; but the tapered nail, as seen in Fig. 3, is preferred.

Having thus described my invention, what I claim, and desire to secure by Letters Patent, is—

A weather-tiling fastening composed of the bushing $d$ and nail $a'$, constructed in the manner and for the purpose described.

W. E. WORTHEN.

Witnesses:
RICH. S. GILLESPIE,
A. STELER. (24)